United States Patent [19]
Kitamine et al.

[11] Patent Number: 6,034,494
[45] Date of Patent: Mar. 7, 2000

[54] CONTROL DEVICE FOR BRUSHLESS DC MOTOR

[75] Inventors: Yasukazu Kitamine, Kariya; Satoru Kodama, Obu, both of Japan

[73] Assignee: Denso Corporation, Kariya, Japan

[21] Appl. No.: 09/205,763

[22] Filed: Dec. 4, 1998

[30] Foreign Application Priority Data

Jan. 20, 1998 [JP] Japan ................... 10-008825

[51] Int. Cl.$^7$ ....................................... H02P 6/18
[52] U.S. Cl. ..................... 318/254; 318/431; 318/437
[58] Field of Search .................... 318/138, 254, 318/430, 431, 437, 439, 700, 705, 720, 721, 722, 724

[56] References Cited

U.S. PATENT DOCUMENTS

| | | | |
|---|---|---|---|
| 5,378,976 | 1/1995 | Inaji et al. ........................ | 318/810 |
| 5,783,917 | 7/1998 | Takekawa ........................ | 318/439 |
| 5,814,957 | 9/1998 | Yoshida ........................... | 318/439 |

FOREIGN PATENT DOCUMENTS

3-239186  10/1991  Japan .
9-131091   5/1997  Japan .

*Primary Examiner*—Bentsu Ro
*Attorney, Agent, or Firm*—Pillsbury Madison & Sutro LLP

[57] ABSTRACT

A control device controls operation of a brushless DC motor in such a way that the motor is started and accelerated up to a predetermined rotational speed by applying driving voltage formulated based on a synchronous signal under a startup-drive-mode and the driving mode is switched, after the predetermined rotational speed is established, to a self-controlled-drive-mode in which the driving voltage is formulated based on signals indicating an angular position of the rotor relative to the armature. In the transient period for switching-over from the start-up-drive to the self-controlled-drive, phase difference between the driving voltage and the rotor position signal is detected for a period covering more than one rotation of the rotor, the switching-over is carried out only when the phase difference is sufficiently small to avoid a motor stall or an excessive shock. Preferably, a pulse-width-modulated voltage is used as the driving voltage, so that the phase difference can be controlled by changing a duty ratio of the driving voltage.

9 Claims, 7 Drawing Sheets

CONTROL DEVICE FOR BRUSHLESS DC MOTOR

CROSS-REFERENCE TO RELATED APPLICATION

This application is based upon and claims benefit of priority of Japanese Patent Application No. Hei-10-8825 filed on Jan. 20, 1998, the content of which is incorporated herein by reference.

BACKGROUND OF THE INVENTION

1. Field of the Invention

The present invention relates to a control device for a brushless direct current motor. The control device switches operation of the motor from a start-up-drive mode to a self-controlled-drive mode.

2. Description of Related Art

A brushless DC motor control device which automatically switches its operation from a start-up-drive to a self-controlled-drive has been known hitherto. The control device of this kind operates the motor by imposing PWM (pulse-width-modulated) driving voltage having a duty ratio in a predetermined range on an armature to generate a rotating field therein until the motor reaches a certain speed (start-up-drive). After the motor reached a certain speed, the control device detects a rotor position from a phase of voltage generated by the armature, formulates PWM driving voltage having a phase corresponding to the rotor position and operates the motor by applying PWM driving voltage to the armature (self-controlled drive). Speed control under the self-controlled-drive is performed by changing the duty ratio of the PWM driving voltage. Since the control device of this kind operates the motor based on the phase of induced armature voltage under the self-controlled-drive, there is no need to equip the motor with a separate rotor position sensor, and therefore the structure of the motor can be simplified. Under the start-up-drive, it is preferable to employ a current controlled PWM operation to limit a high current which tends to appear at a low speed. Generally, a carrier frequency in the current controlled PWM is set at a relatively low level to secure a sufficient current shut-off period. On the other hand, under the self-controlled-drive a carrier having a relatively high frequency is used, avoiding an audible frequency band, because a high current does not appear due to a high speed of the motor. However, in the conventional control, a drive synchronism may be lost (loss of synchronism) and the motor may stop at a transition from the start-up-drive to the self-controlled-drive if a drive torque change is large, e.g., a duty ratio change is too small to cover the torque change. If the duty ratio change is too large, then current consumption and a shock at the transition become large.

To cope with the problem mentioned above, a control method to change the duty ratio gradually during the transition period is proposed in JP-A-9-131091. The duty ratio of the PWM driving voltage immediately after the transition to self-controlled-drive is determined according to the duty ratio of the start-up-drive immediately before the transition. Then, the duty ratio is gradually decreased so that a phase difference between the PWM driving voltage and a detected armature voltage becomes within a predetermined range, and the driving mode is switched to the self-controlled-drive after the phase difference becomes sufficiently small. Generally, rotational speed of the brushless DC motor includes a periodical fluctuation when the motor drives a load such as a compressor having a drive torque ripple. The period of such fluctuation is shorter than a period of one rotation of the motor. Therefore, in the conventional device, there is a possibility that the motor stops due to a loss of synchronism when the motor speed fluctuates immediately after the drive mode is switched to the self-controlled-drive.

SUMMARY OF THE INVENTION

The present invention has been made in view of the above-mentioned problem, and an object of the present invention is to provide a control device for a brushless DC motor which is able to smoothly switch the drive modes from the star-up-drive to the self-controlled-drive even if the rotational speed fluctuation is involved.

Multi-phase driving voltage, preferably pulse-width-modulated 3-phase driving voltage is applied to an armature of the brushless DC motor. During a starting up period in which the motor is started and accelerated up to a predetermined rotational speed, the driving voltage is formulated in an inverter based on a synchronous signal supplied thereto from a control device which includes a microcomputer. When the motor reaches the predetermined rotational speed, a signal indicating rotor position relative to the armature is generated in the armature. At the same time, a phase difference between the driving voltage and the rotor position signal is detected by the control device for a period covering more than one rotation of the rotor. When all the phase difference throughout the period becomes smaller than a predetermined amount, a driving voltage formulated based on the rotor position signal is applied to the armature. In other words, the motor is driven up to a predetermined rotational speed under the start-up-drive mode, the phase difference between the driving voltage and the rotor position signal is detected during a transient period, and then the motor is driven under the self-controlled-drive mode when the phase difference becomes less than a predetermined amount. In this manner, the drive modes of the motor are smoothly switched from the start-up-drive to the self-controlled-drive without causing a stall due to a loss of synchronism or an excessive shock, even when a rotational speed fluctuation due to a load ripple is involved.

The phase difference between the driving voltage and the rotor position signal is detected for a period covering more than one rotation of the rotor to secure a smooth switching-over to the self-controlled-drive, as opposed to the conventional control device mentioned above. In case a pulse-width-modulated driving voltage is used as the driving voltage, the driving voltage phase is advanced by increasing a duty ratio of the driving voltage or delayed by decreasing the duty ratio to make smaller the phase difference between the driving voltage and the rotor position signal. The driving mode switching-over may be carried out when all the signals indicating the phase difference become smaller than a predetermined amount, or when a part of the phase difference signals become smaller a predetermined amount and the rest of the signals show that the driving voltage is advanced from the rotor position signals. Alternatively, the switching-over may be carried out when all the phase difference signals indicate that the driving voltage is in advance immediately after the duty ratio of the pulse-width-modulated driving voltage is increased. It is also possible to design the control device not to carry out the switching-over if a part of the phase difference signals indicate that the driving voltage is delayed from the rotor position signals to surely avoid a motor stall or a shock associated with the switching-over.

Other objects and features of the present invention will become more readily apparent from a better understanding of the preferred embodiment described below with reference to the following drawings.

DETAILED DESCRIPTION OF THE PREFERRED EMBODIMENT

A preferred embodiment of the present invention will be described, referring to drawings. First, a whole structure of the control device for a brushless DC motor will be described, referring to FIG. 1. Electric power is supplied to a brushless DC motor 1 from a DC power source 9 through an inverter 2 having semiconductor switching elements. The brushless DC motor 1 is used to drive an airconditioner compressor (not shown) mounted on a vehicle and has an armature winding of Y-connection. A current sensor 3 for detecting a current supplied to the motor 1 is connected between the DC power source 9 and the inverter 2. A rotor position detecting circuit 4 connected to an armature winding detects angular positions of a rotor, and a driving current control circuit 5 connected to the current sensor 3 outputs a control signal 5a. A duty ratio detector 6 connected to the driving current control circuit 5 detects a duty ratio based on the control signal 5a. A driving signal generator 7 formulates 3-phase upper arm driving signals 7u, 7v, 7w from 3-phase upper arm signals 8u, 8v, 8w, another control signal 8a and a switching signal 8b which switches the control signals 5a, 8a. A microcomputer 8 formulates various signals and functions as a control center of the control device.

Figure 1:
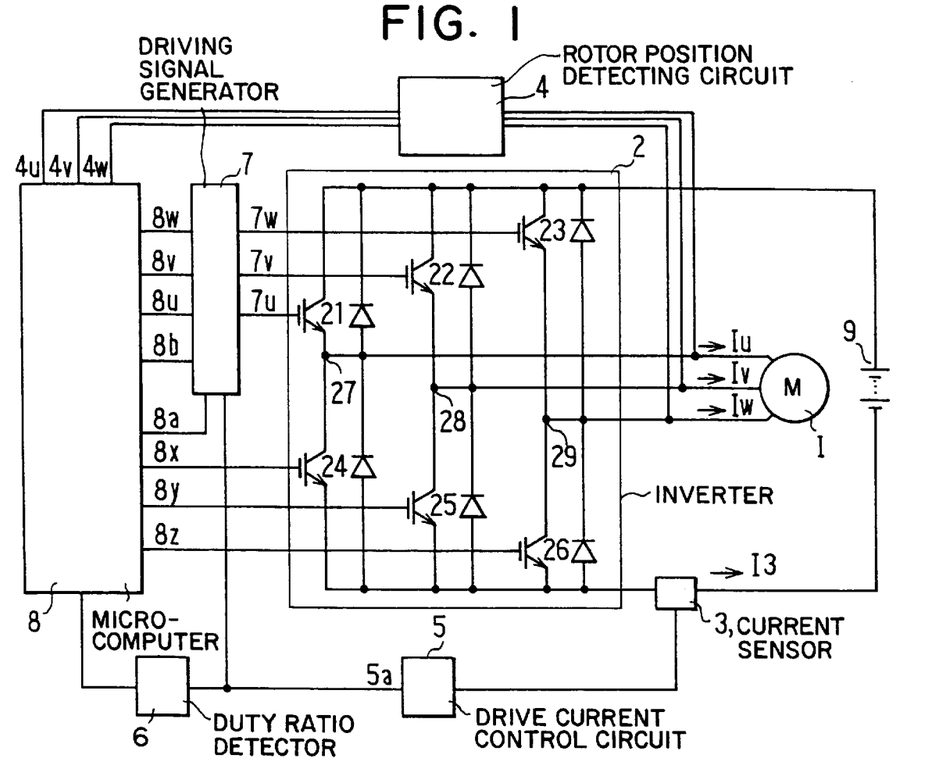
FIG. 1 is a block diagram showing a control device for a brushless DC motor according to the present invention.

The microcomputer 8 formulates the 3-phase upper arm signals 8u, 8v, 8w, 3-phase lower arm signals 8x, 8y, 8z, the control signal 8a and the switching signal 8b, based on rotor position signals 4u, 4v, 4w supplied from the rotor position detecting circuit 4 and a duty ratio signal supplied from the duty ratio detector 6. The inverter 2 is composed of IGBTs (insulated gate bipolar transistors) 21, 22, 23, each collector of which is connected to a plus terminal of the DC power source 9, IGBTs 24, 25, 26, each emitter of which is connected to a minus terminal of the DC power source 9 and feedback diodes D each connected between the collector and emitter of each IGBT. The IGBTs 21, 22, 23 constitute an upper arm of the inverter 2 together with respective diodes D, and the IGBTs 24, 25, 26 constitute a lower arm of the inverter 2 together with respective diodes D. Three connecting points connecting the upper and lower arms are connected to the three-phase armature winding of the motor 1.

The current sensor 3 connected between the minus terminal of the DC power source 9 and the lower arm detects current supplied to the motor 1 through the inverter 2. The rotor position detecting circuit 4 is composed of three filter circuits (not shown) which detect low frequency components in the 3-phase driving voltage supplied from the inverter 2 to the motor 1 and three comparators (not shown) which convert the low frequency components into rotor position signals 4u, 4v, 4w. The rotor position signals 4u, 4v, 4w are fed to the microcomputer 8. The driving current control circuit 5 formulates a control signal 5a having a predetermined pulse width when the current detected by the current sensor 3 exceeds a predetermined level. The control signal 5a is fed to the duty ratio detector 6 and the driving signal generator circuit 7. The duty ratio detector 6 detects a duty ratio from the control signal 5a and feeds the detected duty ratio to the microcomputer 8.

Figure 2:
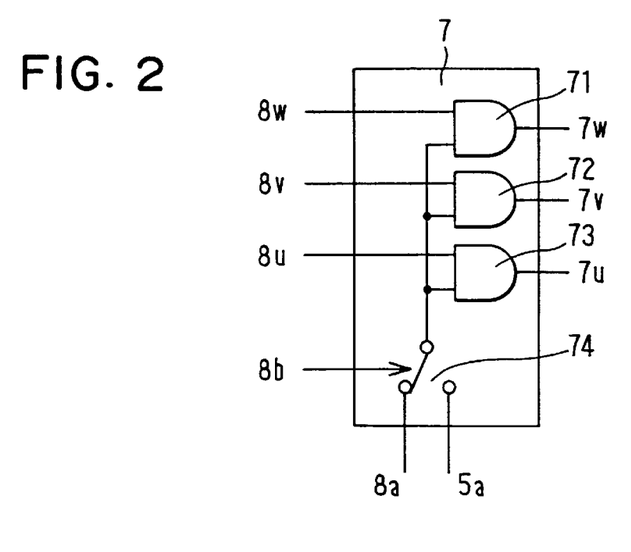
FIG. 2 is a diagram showing a driving signal generator circuit used in the control device shown in FIG. 1.

As shown in FIG. 2, the driving signal generator circuit 7 is composed of AND gates 71, 72, 73 and a switch 74. The switch 74 switches control signals 5a and 8a therebetween according to the switching signal 8b. The AND gates 71, 72, 73 output 3-phase upper arm driving signals 7u, 7v, 7w (PWM driving signals in this embodiment) based on the 3-phase upper arm signals 8u, 8v, 8w when either control signal 5a or 8a is a high level signal. Therefore, the duty ratio of the PWM driving voltage supplied from the inverter 2 to the motor 1 is determined by the control signal 5a when the switching signal 8b is at one level, and by the control signal 8a when the switching signal 8b is at another level.

The microcomputer 8 formulates the 3-phase upper arm signals 8u, 8v, 8w and the 3-phase lower arm signals 8x, 8y, 8z based on a synchronous signal when the motor 1 is driven under the start-up-drive mode. Waveforms of these signals are shown in a timing chart in FIG. 3. To limit motor current Iu, Iv, Iw under the start-up-drive mode, the driving signal generator circuit 7 modulates the 3-phase upper arm signals 8u, 8v, 8w by pulses of the control signal 5a and formulates the 3-phase upper arm driving signals 7u, 7v, 7w. The 3-phase upper arm signals 8u, 8v, 8w, the 3-phase lower arm signals 8x, 8y, 8z, current I3 detected by the current sensor 3, the control signal 5a, the 3-phase upper arm driving signals 7u, 7v, 7w, and the motor current (PWM driving current) Iu, Iv, Iw are respectively shown in a timing chart in FIG. 5 in this order. Under the self-controlled drive mode, the microcomputer 8 formulates the 3-phase upper arm signals 8u, 8v, 8w and the 3-phase lower arm signals 8x, 8y, 8z based on the rotor position signals 4u, 4v, 4w. Microcomputer 8 in conjunction with current sensor 3 in FIG. 1 operates as means for detecting the driving voltage supplied to the armature under the start-up-drive mode.

Figure 3:
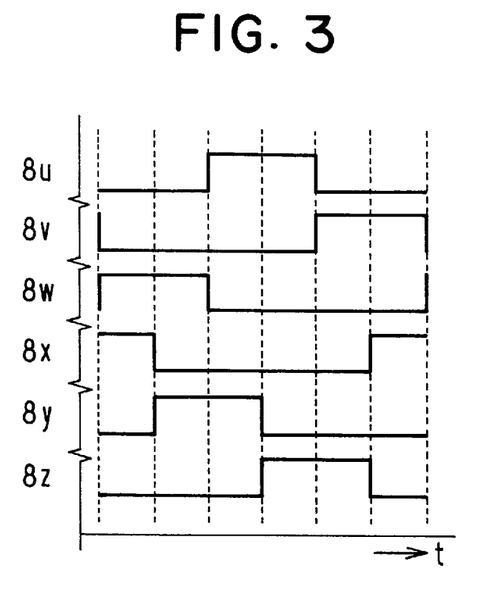
FIG. 3 is a timing chart showing inverter signals in the control device.
Figure 4:
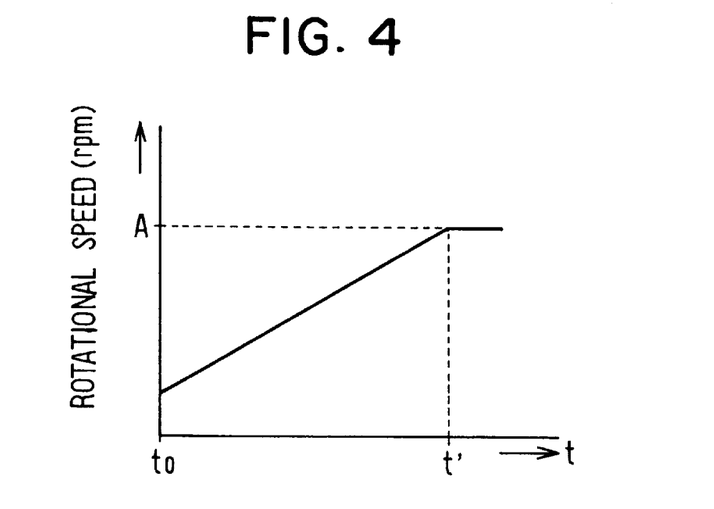
FIG. 4 is a graph showing a motor speed increase under a start-up-drive mode.
Figure 5:
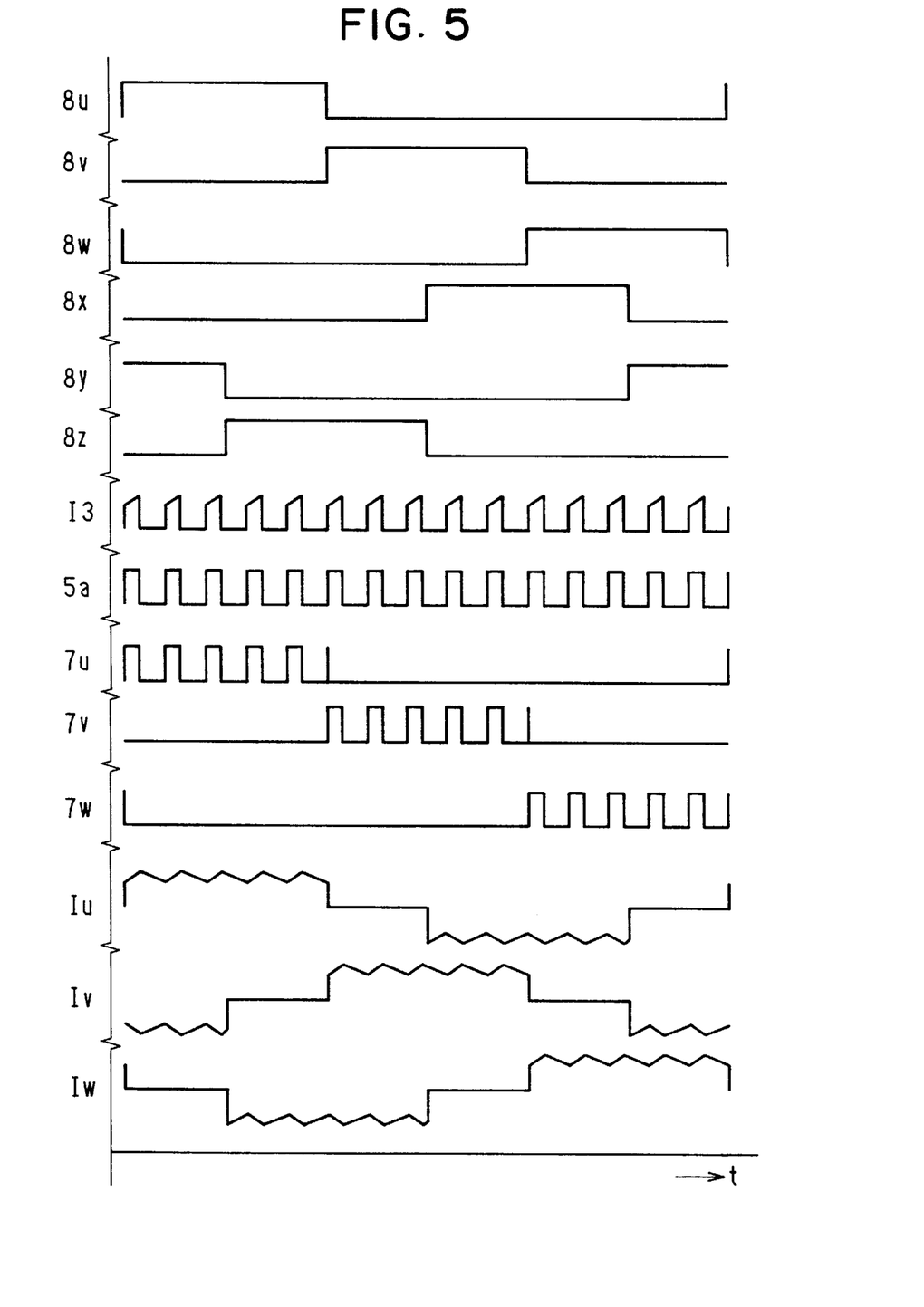
FIG. 5 is a timing chart showing various waveforms in the control device under the start-up-drive.

Now, operation of the control device for the brushless DC motor will be described. To drive the motor under the start-up-drive mode, the 3-phase upper and lower signals 8u–8z shown in FIG. 3 are formulated based on a synchronous signal, and thereby the motor speed increases as shown in FIG. 4. The motor is started at time t0, and its rotational speed reaches a predetermined saturated speed "A" at time t'. In order to limit the driving current to a predetermined level, the 3-phase upper arm signals 8u, 8v, 8w are modulated by the control signal 5a to form the 3-phase upper arm driving signals 7u, 7v, 7w as shown in FIG. 5. In other words, current control PWM is performed.

When the motor speed reaches speed "A", acceleration of the motor is terminated, and the frequency of signals 8u–8z becomes constant. At that time, the switching signal 8b changes its level, and thereby the control signal 5a is switched to the other control signal 8a. The 3-phase upper arm signals 8u, 8v, 8w are modulated (PWM) by the control signal 8a. The duty ratio of the control signal 8a is set so that the PWM driving voltage becomes equal to, or a little higher than, the PWM driving voltage imposed at time t'. The duty ratio of the control signal 8a (referred to as DUTY8a) is determined from the duty ratio of the control signal 5a (referred to as DUTY5a), predetermined PWM carrier frequencies of the control signals 5a and 8a according to the following equation.

$$DUTY8a = DUTY5a + td \cdot (f5a - f8a) + Z,$$

where td is an operation delay time of IGBTs 21–26, f5a is a PWM carrier frequency of the control signal 5a, f8a is a PWM carrier frequency of the control signal 8a, and Z is a predetermined value. Z is set at zero to make the PWM driving voltage equal to that imposed at time t' and at a predetermined value to make the PWM driving voltage a little higher than that imposed at time t'.

Hereafter, the microcomputer 8 calculates a phase difference between a phase (real phase) of the rotor position signals 4u, 4v, 4w fed from the rotor position detecting circuit 4 and a phase (driving voltage phase) of the 3-phase upper and lower signals 8u–8z. In case Z is set at zero, the duty ratio of the PWM driving voltage is increased until the phase difference becomes smaller than a predetermined amount when the driving voltage phase is delayed from the real phase. On the other hand, the duty ratio of the PWM driving voltage is decreased until the phase difference becomes smaller than the predetermined amount when the driving voltage phase is advanced from the real phase. The driving mode is switched from the start-up-drive to the self-controlled-drive when the phase difference becomes smaller than the predetermined amount in both situations. In case Z is set at a predetermined value, the driving voltage phase is made to be always advanced from the real phase at time t', and then the driving voltage phase is gradually delayed by decreasing the duty ratio of 8a, so that the driving voltage phase comes close to the real phase. When the phase difference becomes smaller than the predetermined amount, the driving mode is switched from the start-up-drive to the self-controlled-drive.

Figure 6:
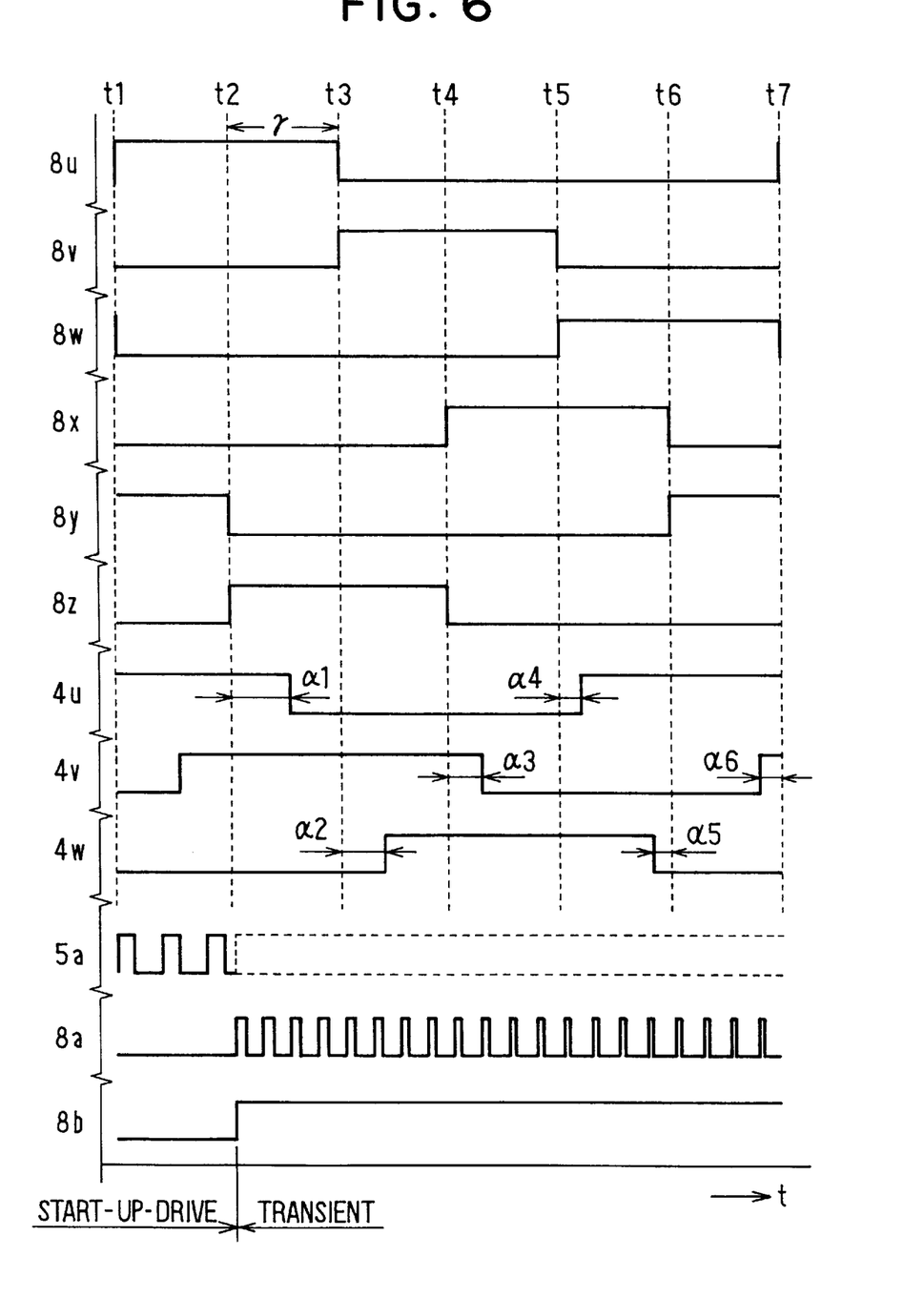
FIG. 6 is a timing chart showing various waveforms in the control device under a transient period from the start-up-drive to the self-controlled-drive.

Operation of the control device in a transient period from the start-up-drive to the self-controlled-drive will be described in detail, referring to a timing chart shown in FIG. 6. At time t2 the control signal 5a is switched to the other control signal 8a, thereby switching a current control PWM to a speed control PWM. The rotor position signal 4u is delayed by α1 measured from time t2 when the signal 8y changes from a high level (H) to a low level (L) and the signal 8z becomes from L to H. In other words, the driving voltage phase is advanced from the real phase by a1 at this time. The rotor position signal 4w is delayed by a2 measured from time t3 when the signal 8v becomes from L to H and the signal 8u becomes from H to L. In other words, the driving voltage phase is advanced from the real phase by u2 at this time. The rotor position signal 4v is delayed by a3 measured from time t4 when the signal 8z becomes H to L and the signal 8x becomes from L to H. In other words, the driving voltage phase is advanced from the real phase by a3 at this time. The rotor position signal 4u is delayed by a4 measured from time t5 when the signal 8w becomes L to H and the signal 8v becomes from H to L. In other words, the driving voltage phase is advanced from the real phase by a4 at this time. The rotor position signal 4w is advanced by a5 measured from time t6 when the signal 8x becomes H to L and the signal 8y becomes L to H. In other words, the driving voltage phase is delayed from the real phase by a5 at this time. The rotor position signal 4v is advanced by a6 measured from time t7 when the signal 8u becomes L to H and the signal 8w becomes from H to L. In other words, the driving voltage phase is delayed from the real phase by a6 at this time. The phase difference (in terms of angle) "Pd" between signals 8u–8z and rotor position signals 4u–4w is calculated from α1–α6 (collectively referred to as αi) according to the following equation.

$$360:Pd = 60/(N \cdot p):\alpha i$$

$$Pd = 360 \times \alpha i \times N \times p \div 60 = 6 \times \alpha i \times N \times p,$$

where N is rotational speed of the motor, and p is number of pole pairs of the motor.

The situation where the driving voltage phase is advanced from the real phase (as in α1, α2, α3 and α4) is named as an advanced phase, and the phase difference in that situation is called a plus (+) phase difference. On the other hand, the situation where the driving voltage phase is delayed from the real phase (as in α5 and α6) is named as an delayed phase, and the phase difference in that situation is called a minus (−) phase difference. In this particular embodiment shown in FIG. 6, the plus phase difference is gradually decreased as time passes from time t2 to time t5, and the phase difference turns to minus at time t6 and its absolute value increases at time t7. The phase difference Pd in terms of electrical angle is divided into three situations, A, B and C.

A : 10°<Pd
B : 0°≦Pd≦10°
C : Pd<0°

In other words, A denotes the situation where the driving voltage phase is advanced by more than 10°, B denotes the situation where it is advanced by less than 10°, and C denotes the situation where it is delayed. The time interval γ between t2 and t3 shown in FIG. 6 corresponds to 60° in terms of electrical angle, and other intervals between neighboring times through t1–t7 are all the same, i.e., 60°.

Figure 7:
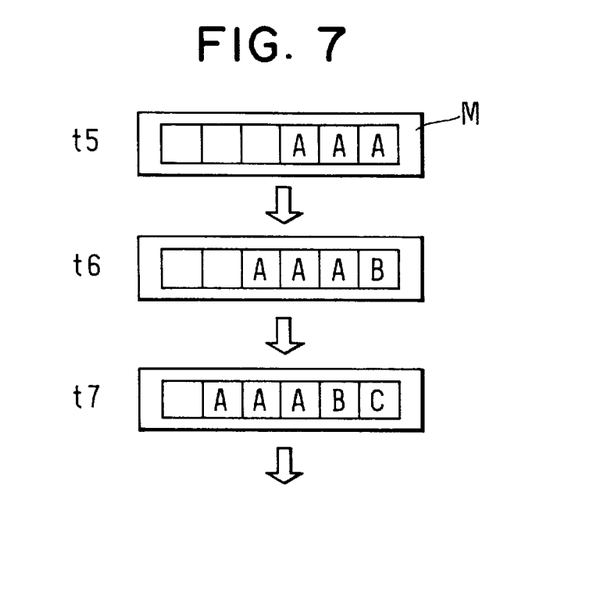
FIG. 7 is a diagram showing memory contents in a memory in a microcomputer of the control device.

FIG. 7 shows memory contents stored in a memory M in the microcomputer 8. The phase difference Pd between signals 8u–8z and rotor position signals 4u–4w is detected and memorized in the memory M in the form of A, B or C each time a level combination (combination of H and L) of the signals 8u–8z changes, i.e., at time t1, t2 . . . t7, respectively. Since the number of rotor pole pairs in this embodiment is 2, the rotor makes one rotation from time t1–t7, that is, the phase difference Pd is memorized in the memory M six times in one rotation. At time t5, Pd is memorized three times as shown in the top box in FIG. 7, four times at time t6 as shown in the middle box, and five times at time t7 as shown in the bottom box.

Figure 8:
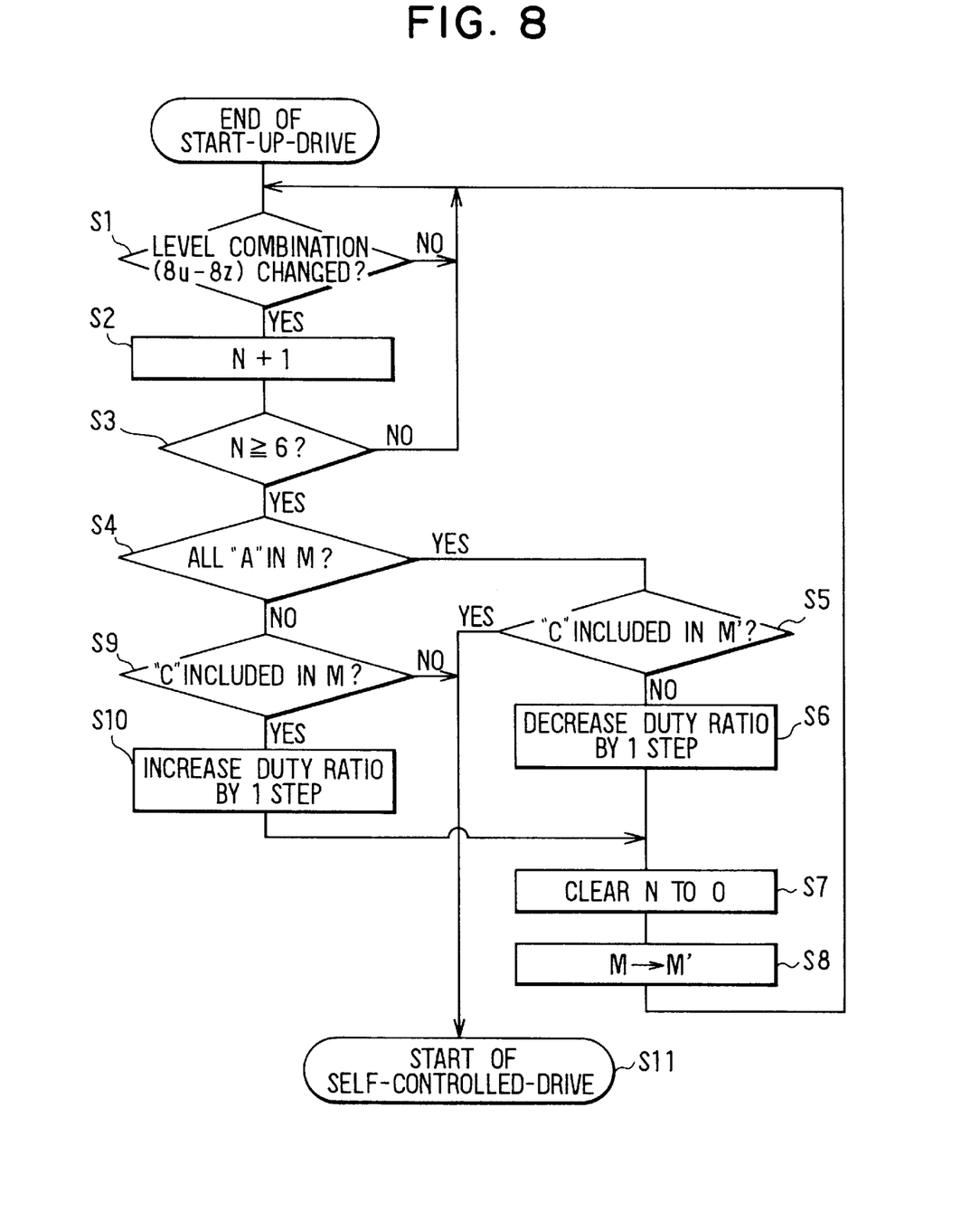
FIG. 8 is a flowchart showing a control process during the transient period.

A control process in the transient period from the start-up-drive to the self-controlled-drive is shown in FIG. 8. At step S1, whether the level combination among signals 8u–8z changed is detected, i.e., whether it is a timing to check the phase difference Pd is judged. If it is a timing to check Pd, 1 is added to a count N at step S2. The count N is used for performing a phase difference judgment every rotation of the rotor, and its initial value is zero. At step S3, whether the count N is equal to or larger than 6 is checked, i.e., whether the rotor made one rotation after a previous phase difference judgment had been made. If the rotor made one rotation, whether all of the memory contents are A or not is checked at step S4. If the all memory contents are A, the process moves to step S5. If not, the process moves to step S9. At step S5, whether a previous memory M' includes C or not is checked. The previous memory M' includes six phase difference data during a previous rotation, while the memory M includes six data during a present rotation. If there is no C included in the previous memory M', it is judged that the duty ratio is too high, and the process moves to step S6 where the duty ratio of the PWM driving voltage is decreased by one step. The duty ratio of the PWM driving voltage has 64 steps in this embodiment. Then, the process moves to step S7 where the count N is cleared to zero. Then, at step S8, the memory M is stored as M', and the process returns to step S1. On the other hand, if C is included in the previous memory M' at step S5, it is judged that a delayed phase has been changed to an advanced phase skipping B, and the process moves to step S11 where the control mode is switched to the self-controlled-drive.

If it is judged that the memory M includes data other than A at step S4, then the process moves to step S9. At step S9, whether C is included in the memory M or not is checked. If C is not included (that means all the data in M are either A or B), it is judged that the PWM driving voltage is advanced. Therefore, the process moves to step S11 where the control mode is switched to the self-controlled-drive. If there is C included in M at step S9, it is judged that the duty ratio is too low, and the process moves to step S10 where the duty ratio is increased by one step. Then, the process moves to step S7 where the count N is cleared to zero, and then at step S8 where the N is stored as M'. Then, the process returns to step S1 to further continue the phase difference judgment.

Figure 9A:
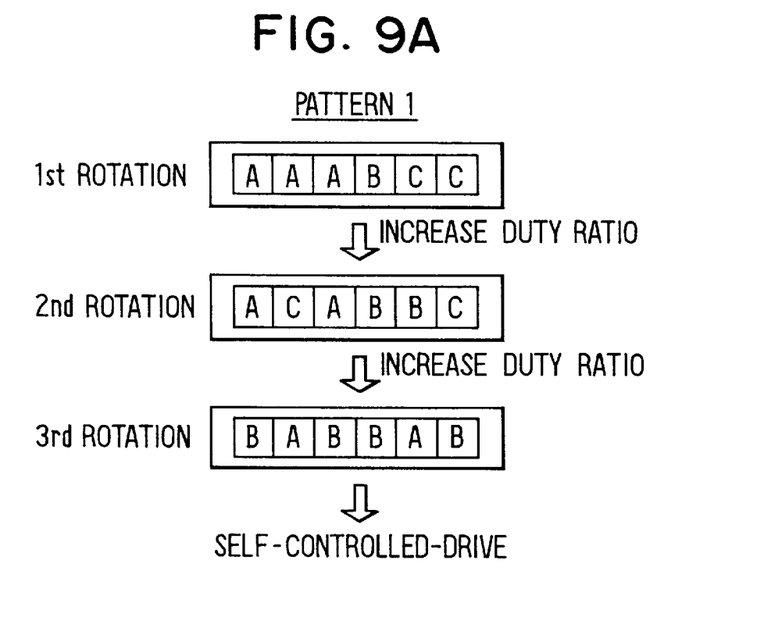
FIGS. 9A and 9B are diagrams showing memory contents in the memory in the microcomputer of the control device.
Figure 9B:
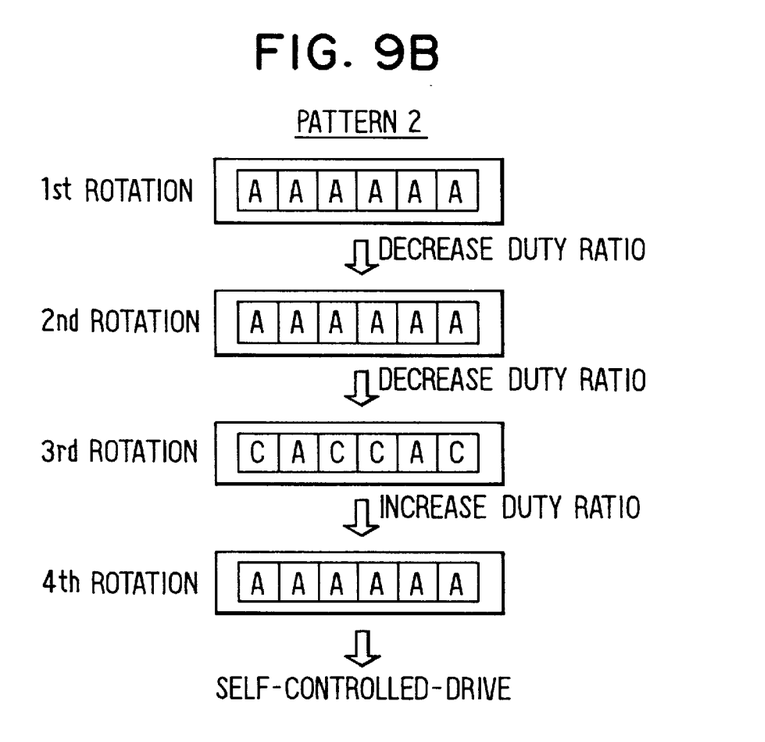

FIG. 9A shows an example (pattern 1) of the memory contents in the first, second and third rotations of the rotor. In this example, the duty ratio is increased by one step after the first rotation and another step after the second rotation. After the completion of the third rotation, the control mode is switched to the self-controlled-drive, because there is no C included in the memory M. FIG. 9B shows another example (pattern 2) of the memory contents in the first to the fourth rotations. After the first rotation the duty ratio is decreased by one step, because the memory contents are all A. After the second rotation the duty ratio is decreased by one more step, because the memory contents are still all A. After the third rotation the duty ratio is increased by one step, because C is included in the memory. After completion of the fourth rotation, the control mode is switched to the self-controlled-drive, because the memory M includes no data other than A and the previous memory M' includes C.

Figure 10:
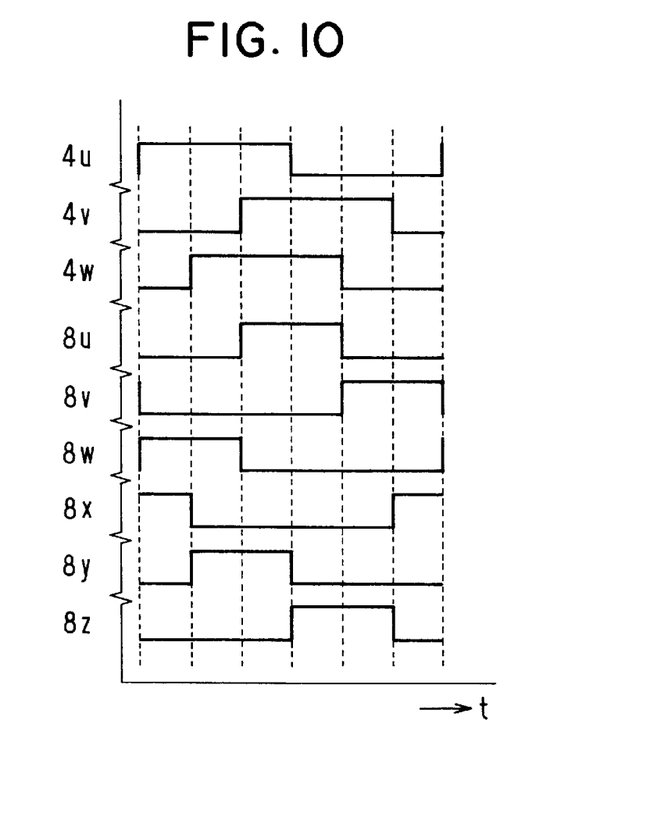
FIG. 10 is a timing chart showing various waveforms in the control device under the self-controlled-drive.

Under the self-controlled-drive mode, the phase relation between the rotor position signals 4u,–4w and the signals 8u–8z becomes as shown in FIG. 10. At the time of transition to the self-controlled-drive, the rotational speed of the motor shows substantially no change, and the start-up-drive mode is smoothly switched to the self -controlled-drive mode.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A control device for a brushless DC motor having an armature and a rotor, the control device comprising:

an inverter having semiconductor switching elements for switching DC current on and off and supplying multi-phase driving voltage to the armature;

means for starting and accelerating the motor to a predetermined rotational speed by controlling the inverter under a start-up-drive mode;

means for detecting an angular position of the rotor based on voltage induced in the armature;

means for driving the motor by controlling the inverter based on the detected angular position of the rotor under a self-controlled-drive mode;

means for detecting a phase difference between a phase of the detected angular position of the rotor and a phase of the driving voltage supplied to the armature; and means for switching drive modes from the start-up-mode to the self-controlled-mode, wherein:

the switching means switches the start-up-drive mode to the self-controlled-drive mode based on a plurality of signals representing the phase difference detected in a predetermined period of time, and further including means for detecting the driving voltage supplied to the armature under the start-up-drive mode.

2. The control device as in claim 1, wherein:

the driving voltage supplied to the armature is a pulse-width-modulated voltage.

3. A control device for a brushless DC motor having an armature and a rotor, the control device comprising:

an inverter having semiconductor switching elements for switching DC current on and off and supplying multi-phase driving voltage to the armature;

means for starting and accelerating the motor to a predetermined rotational speed by controlling the inverter under a start-up-drive mode;

means for detecting an angular position of the rotor based on voltage induced in the armature;

means for driving the motor by controlling the inverter based on the detected angular position of the rotor under a self-controlled-drive mode;

means for detecting a phase difference between a phase of the detected angular position of the rotor and a phase of the driving voltage supplied to the armature; and means for switching drive modes from the start-up-mode to the self-controlled-mode, wherein:

the switching means switches the start-up-drive mode to the self-controlled-drive mode based on a plurality of signals representing the phase difference detected in a predetermined period of time, and wherein the switching means, in a transient period from the star-up-drive mode to the self-controlled-drive mode, decreases duty ratio of the pulse-width-modulated driving voltage when the phase of the driving voltage is advanced by more than a predetermined amount from the phase of the angular position of the rotor, and increases the duty ratio of the pulse-width-modulated driving voltage when the phase of the driving voltage is delayed by more than a predetermined amount from the phase of the angular position of the rotor, thereby making the phase difference between both phases smaller.

4. The control device as in claim 3, wherein:

the plurality of signals representing the phase difference are detected in a period of time covering more than one rotation of the rotor.

5. The control device as in claim 3, wherein:

the switching means switches the start-up-drive mode to the self-controlled-drive mode when all of the plurality of signals representing the phase difference are included in a predetermined range.

6. The control device as in claim 3, further including means for detecting a driving current flowing through the inverter and for limiting an amount of the driving current by controlling a duty ratio of the driving voltage supplied to the armature under the start-up-drive mode.

7. A control device for a brushless DC motor having an armature and a rotor, the control device comprising:

an inverter having semiconductor switching elements for switching DC current on and off and supplying multi-phase driving voltage to the armature;

means for starting and accelerating the motor to a predetermined rotational speed by controlling the inverter under a start-up-drive mode;

means for detecting an angular position of the rotor based on voltage induced in the armature;

means for driving the motor by controlling the inverter based on the detected angular position of the rotor under a self-controlled-drive mode;

means for detecting a phase difference between a phase of the detected angular position of the rotor and a phase of the driving voltage supplied to the armature; and means for switching drive modes from the start-up-mode to the self-controlled-mode, wherein:

the switching means switches the start-up-drive mode to the self-controlled-drive mode based on a plurality of signals representing the phase difference detected in a predetermined period of time, and wherein the switching means switches the start-up-drive mode to the self-controlled-drive mode when a part of the plurality of signals representing the phase difference is included in a predetermined range and the rest of the signals indicate that the phase of the driving voltage is advanced from the phase of the rotor position.

8. A control device for a brushless DC motor having an armature and a rotor, the control device comprising:

an inverter having semiconductor switching elements for switching DC current on and off and supplying multi-phase driving voltage to the armature;

means for starting and accelerating the motor to a predetermined rotational speed by controlling the inverter under a start-up-drive mode;

means for detecting an angular position of the rotor based on voltage induced in the armature;

means for driving the motor by controlling the inverter based on the detected angular position of the rotor under a self-controlled-drive mode;

means for detecting a phase difference between a phase of the detected angular position of the rotor and a phase of the driving voltage supplied to the armature; and means for switching drive modes from the start-up-mode to the self-controlled-mode, wherein:

the switching means switches the start-up-drive mode to the self-controlled-drive mode based on a plurality of signals representing the phase difference detected in a predetermined period of time, and wherein the driving voltage supplied to the armature is a pulse-width-modulated voltage, wherein the switching means switches the start-up-drive mode to the self-controlled-drive mode when all of the plurality of signals representing the phase difference, detected immediately after a duty ratio of the pulse-width-modulated driving voltage is increased by a predetermined amount, indicate that the phase of the driving voltage is advanced from the phase of the rotor position.

9. A control device for a brushless DC motor having an armature and a rotor, the control device comprising:

an inverter having semiconductor switching elements for switching DC current on and off and supplying multi-phase driving voltage to the armature;

means for starting and accelerating the motor to a predetermined rotational speed by controlling the inverter under a start-up-drive mode;

means for detecting an angular position of the rotor based on voltage induced in the armature;

means for driving the motor by controlling the inverter based on the detected angular position of the rotor under a self-controlled-drive mode;

means for detecting a chase difference between a phase of the detected angular position of the rotor and a phase of the driving voltage supplied to the armature; and means for switching drive modes from the start-up-mode to the self-controlled-mode, wherein:

the switching means switches the start-up-drive mode to the self-controlled-drive mode based on a plurality of signals representing the phase difference detected in a predetermined period of time, and wherein the switching means does not switch the start-up-drive mode to the self-controlled-drive mode when a part of the plurality of signals representing the phase difference indicates that the phase of the driving voltage is delayed from the phase of the rotor position.

* * * * *